(12) United States Patent
Murayama

(10) Patent No.: US 8,970,745 B2
(45) Date of Patent: Mar. 3, 2015

(54) IMAGE PROCESSING DEVICE, IMAGE PROCESSING METHOD AND STORAGE MEDIUM TO SUPPRESS SHADING OF IMAGES IN WHICH PIXEL ADDITION PROCESSING IS PERFORMED

(75) Inventor: Yoichi Murayama, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 13/591,519

(22) Filed: Aug. 22, 2012

(65) Prior Publication Data
US 2013/0050529 A1   Feb. 28, 2013

(30) Foreign Application Priority Data

Aug. 26, 2011   (JP) ................................ 2011-185039

(51) Int. Cl.
| | | |
|---|---|---|
| H04N 9/64 | (2006.01) |
| H04N 9/68 | (2006.01) |
| H04N 5/217 | (2011.01) |
| H04N 5/232 | (2006.01) |
| H04N 1/40 | (2006.01) |
| G06K 9/40 | (2006.01) |
| H04N 5/357 | (2011.01) |
| H04N 9/04 | (2006.01) |

(52) U.S. Cl.
CPC .............. *H04N 5/3572* (2013.01); *H04N 9/045* (2013.01)
USPC ........... 348/251; 348/234; 348/241; 348/347; 358/461; 382/274

(58) Field of Classification Search
USPC ........................................ 348/234, 241, 251
See application file for complete search history.

(56) References Cited

U.S. PATENT DOCUMENTS

| 6,618,502 B1 | 9/2003 | Okada et al. |
| 6,943,335 B2 | 9/2005 | Hashimoto |

(Continued)

FOREIGN PATENT DOCUMENTS

| JP | 2000-115795 A | 4/2000 |
| JP | 2001-352552 A | 12/2001 |
| JP | 2003-348602 A | 12/2003 |

(Continued)

OTHER PUBLICATIONS

Chinese Office Action dated Sep. 26, 2014, issued in counterpart Chinese Application No. 201210308720.5.

*Primary Examiner* — Timothy J Henn
*Assistant Examiner* — Quan Pham
(74) *Attorney, Agent, or Firm* — Holtz, Holtz, Goodman & Chick PC

(57) ABSTRACT

An imaging device 100 is equipped with an image acquisition unit 51, a first calculation unit 52 and a correction information calculation unit 53. The image acquisition unit 51 acquires image data including a luminance component and color components, via an optical system. The first calculation unit 52 detects shading of the luminance component included in the image data, and detects shading of the color difference components. The correction information calculation unit 53 calculates luminance shading correction coefficients and color difference shading correction coefficients. The correction information calculation unit 53 then converts the calculated color difference shading correction coefficients so as to have predetermined ratios with respect to the calculated luminance shading correction coefficients. A correction processing unit 62 corrects plural sets of image data on the basis of the converted color difference shading correction coefficients, and then performs pixel addition of the images.

8 Claims, 10 Drawing Sheets

(56) References Cited

U.S. PATENT DOCUMENTS

| | | | |
|---|---|---|---|
| 8,054,350 B2 * | 11/2011 | Kyung | 348/251 |
| 8,106,976 B2 | 1/2012 | Kawasaka | |
| 2002/0135688 A1 * | 9/2002 | Niikawa | 348/251 |
| 2008/0204574 A1 | 8/2008 | Kyung | |
| 2009/0002526 A1 * | 1/2009 | Koishi | 348/241 |
| 2011/0128406 A1 * | 6/2011 | Shirai | 348/223.1 |

FOREIGN PATENT DOCUMENTS

| | | | |
|---|---|---|---|
| JP | 2006-229425 A | | 8/2006 |
| JP | 2007-134903 A | | 5/2007 |
| JP | 2009194470 A | * | 8/2009 |

* cited by examiner

IMAGE PROCESSING DEVICE, IMAGE PROCESSING METHOD AND STORAGE MEDIUM TO SUPPRESS SHADING OF IMAGES IN WHICH PIXEL ADDITION PROCESSING IS PERFORMED

This application is based on and claims the benefit of priority from Japanese Patent Application No. 2011-185039, filed on 26 Aug. 2011, the content of which is incorporated herein by reference.

BACKGROUND OF THE INVENTION

1. Field of the Invention

The present invention relates to an image processing device, an image processing method and a storage medium.

2. Related Art

Heretofore, when images through lenses have been captured in digital cameras, there have been occurrences of peripheral light loss (shading), in which light amounts decrease with distance from the center point of a lens toward the periphery.

Shading has become significant in recent years, for reasons such as increases in magnification ratios, reductions in size of the lenses themselves and so forth.

In order to reduce shading, Japanese Unexamined Patent Publication No. 2007-134903 discloses a technology that performs shading correction, multiplying output signals from an imaging component by predetermined gains.

However, in the case of a high dynamic range (HDR) image, which is generated by processing that performs pixel addition of successively shot images with different exposure times, excessive correction may be applied to periphery portions of the image and luminance values may be saturated ("whiteouts"), and in the case of a basically dark image, there may be irregularities in a shading correction gain characteristic from the central portion of the image to peripheral portions, and tone jumps may occur.

SUMMARY OF THE INVENTION

The present invention has been made in consideration of this situation and an object of the invention is to properly suppress shading of images in which pixel addition processing is performed.

To achieve the above object, an image processing device according to an aspect of the present invention is provided with the following structures:

an image data acquisition unit that acquires, via an optical system, image data including a luminance component and a color difference component;

a shading detection unit that detects shading of the luminance component included in the image data and detects shading of the color difference component;

a luminance shading correction coefficient calculation unit that, on the basis of the shading of the luminance component detected by the shading detection unit, calculates a luminance shading correction coefficient that is for correcting the shading of the luminance component;

a color difference shading correction coefficient calculation unit that, on the basis of the shading of the color difference component detected by the shading detection unit, calculates a color difference shading correction coefficient that is for correcting the shading of the color difference component;

a conversion unit that converts the color difference shading correction coefficient calculated by the color difference shading correction coefficient calculation unit so as to be at a predetermined ratio with respect to the luminance shading correction coefficient calculated by the luminance shading correction coefficient calculation unit;

a first acquisition control unit that controls the image data acquisition unit so as to acquire a plurality of sets of image data while altering an exposure condition;

a first correction unit that corrects the images acquired by the first acquisition control unit on the basis of the color difference shading correction coefficient converted by the conversion unit; and a pixel addition unit that performs pixel addition of the images corrected by the first correction unit.

Further, to achieve the above object, an image processing method according to an aspect of the present invention includes the following steps:

a shading detection step of detecting shading of a luminance component included in image data acquired by an image data acquisition unit and detecting shading of a color difference component included in the image data;

on the basis of the shading of the luminance component detected by the shading detection step, calculating a luminance shading correction coefficient that is for correcting the shading of the luminance component;

on the basis of the shading of the color difference component detected by the shading detection step, calculating a color difference shading correction coefficient that is for correcting the shading of the color difference component;

a converting step of converting the color difference shading correction coefficient calculated by the color difference shading correction coefficient calculating step so as to be at a predetermined ratio with respect to the luminance shading correction coefficient calculated by the luminance shading correction coefficient calculating step;

an acquisition controlling step of controlling the image data acquisition unit so as to acquire a plurality of sets of image data while altering an exposure condition;

a correcting step of correcting the images acquired by the acquisition controlling step on the basis of the color difference shading correction coefficient converted by the converting step; and a pixel adding step of performing pixel addition of the images corrected by the correcting.

Further, to achieve the above object, a non-transitory computer readable storage medium according to an aspect of the present invention has stored therein a program executable by a computer equipped with an image data acquisition unit, causing the computer to realize functions of:

detecting shading of a luminance component included in image data acquired by the image data acquisition unit and detecting shading of a color difference component included in the image data;

on the basis of the shading of the luminance component detected by the detecting shading, calculating a luminance shading correction coefficient that is for correcting the shading of the luminance component;

on the basis of the shading of the color difference component detected by the detecting shading, calculating a color difference shading correction coefficient that is for correcting the shading of the color difference component;

converting the color difference shading correction coefficient calculated by the calculating of the color difference shading correction coefficient so as to be at a predetermined ratio with respect to the luminance shading correction coefficient calculated by the calculating of the luminance shading correction coefficient;

controlling the image data acquisition unit so as to acquire a plurality of sets of image data while altering an exposure condition;

correcting the images acquired by the controlling on the basis of the color difference shading correction coefficient converted by the converting; and performing pixel addition of the images corrected by the correcting.

DETAILED DESCRIPTION OF THE INVENTION

Herebelow, a tangible mode of the present invention is described using the attached drawings. The scope of the invention is not limited to the illustrated example.

First Embodiment

Figure 1:
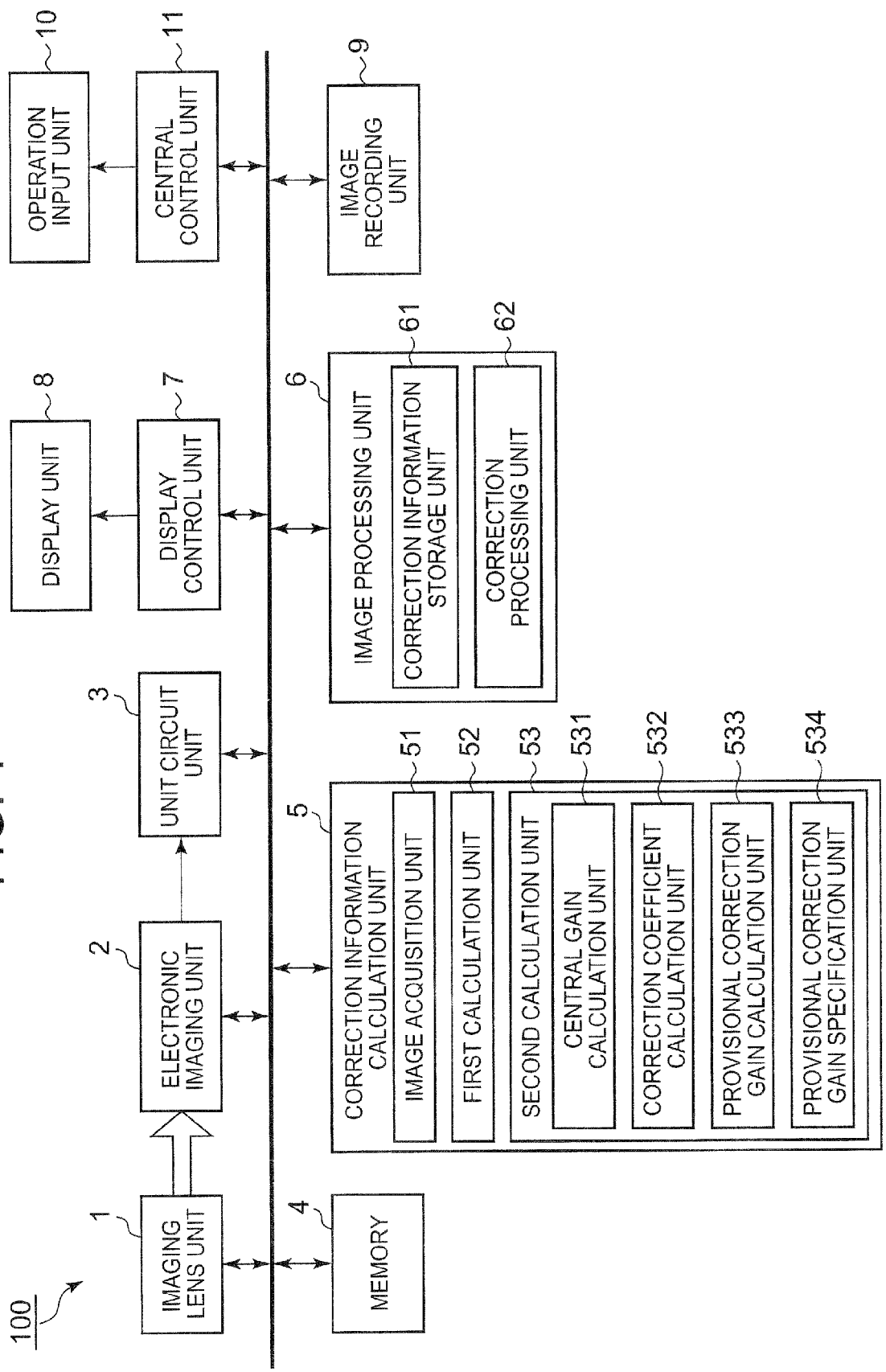
FIG. 1 is a block diagram of an imaging device that serves as an embodiment of the present invention, showing schematic structure thereof.

FIG. 1 is a block diagram showing schematic structure of an imaging device 100 according to a first embodiment in which the present invention is employed.

As shown in FIG. 1, the imaging device 100 is provided with an imaging lens unit 1, an electronic imaging unit 2, a unit circuit unit 3, a memory 4, a correction information calculation unit 5, an image processing unit 6, a display control unit 7, a display unit 8, an image recording unit 9, an operation input unit 10, and a central control unit 11.

Although not illustrated, the imaging lens unit 1 includes, for example, a variety of optical lenses, an aperture and the like, through which it focuses an optical image of an object.

The imaging lens unit 1 is also equipped with an optical zoom mechanism, which is constituted with plural optical lenses.

A focusing distance of the imaging lens unit 1 is altered by, of the plural optical lenses, the position of a zoom adjustment lens (not shown in the drawings) being adjusted along the direction of an optical axis.

Specifically, when an optical zoom ratio is specified by the central control unit 11 in accordance with, for example, predetermined operations of a zoom button of the operation input unit 10 by a user, an unillustrated lens driving unit (for example, a motor, a cam and the like) moves the zoom adjustment lens in the optical axis direction in accordance with a specification instruction and adjusts the position of the zoom adjustment lens in the optical axis direction.

Although not illustrated, the electronic imaging unit 2 is constituted with, for example, an image sensor such as a charge-coupled device (CCD), a complementary metal oxide semiconductor (CMOS) device or the like.

The electronic imaging unit 2 converts the optical image that has passed through the various optical lenses, aperture and the like of the imaging lens unit 1 (which are not shown in the drawings) to two-dimensional image signals, constituted by RGB color components in a substantially rectangular imaging region, and outputs the image signals to the unit circuit unit 3.

Figure 2:
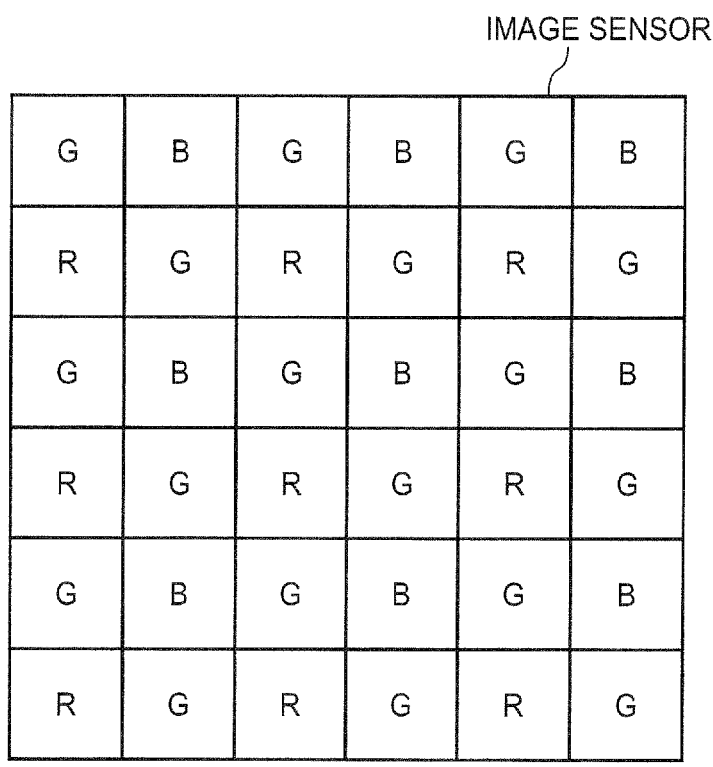
FIG. 2 is a schematic diagram showing an arrangement of pixels (a color filter) at an image sensor of an electronic imaging unit.

FIG. 2 is a schematic diagram showing an arrangement of pixels (a color filter) at the image sensor of the electronic imaging unit 2.

In the present embodiment, the image sensor of the electronic imaging unit 2 is constituted by a single-panel image sensor, and has the commonly known Bayer arrangement.

This has a pattern in which:
1. GR lines, in which image pixels at which red filters are formed (the R component) and image pixels at which green filters are formed (the G component) are alternatingly arranged in a row direction; and
2. GB lines, in which image pixels at which green filters are formed (the G component) and image pixels at which blue filters are formed (the B component) are alternatingly arranged in a row direction, are alternatingly arranged in a column direction.

Color components of red, green and blue in the image data are constituted by image pixels of the R, G and B color components.

The image data of the green component (the G component) may be treated as representing a luminance component of the image data.

The green component is a color component to which human vision is more sensitive than the other components.

Therefore, shading correction may be applied effectively by treating the green component as the luminance component.

Of the green component imaging pixels, imaging pixels in the GR line (hereinafter referred to where appropriate as a GR component), and imaging pixels in the GB line (hereinafter referred to where appropriate as a GB component) may be treated separately.

The unit circuit unit 3 inputs analog image signals constituted by RGB color components according to the optical image of an object that are outputted from the electronic imaging unit 2.

Although not illustrated, the unit circuit unit 3 is constituted with a gain control amplifier, an analog-to-digital converter (ADC) and the like. The gain control amplifier implements correlated double sampling (CDS) with the inputted image signals and amplifies the image signals. The ADC converts the amplified image signals to digital image signals (RGB image data).

Depending on requirements, the unit circuit unit 3 converts the inputted image signals to image data according to the YUV color space (YUV image data), image data according to the HSV color space (HSV image data) or the like, and outputs this image data to the central control unit 11.

The memory 4 is constituted by, for example, dynamic random access memory (DRAM) or the like, and temporarily stores data processed by the correction information calculation unit 5, the image processing unit 6, the display control unit 7, the central control unit 11 and the like, and the like.

The correction information calculation unit 5 is equipped with an image acquisition unit 51, a first calculation unit 52 and a second calculation unit 53.

The image acquisition unit 51 acquires a predetermined image to be used for correction information calculation processing (described below), which is captured by the imaging lens unit 1 and electronic imaging unit 2, and acquires image data of a single-shot image, plural sets of image data with different exposure times for generating an HDR image, and the like.

That is, the electronic imaging unit 2 implements, for example, functions of the central control unit 11 controlling imaging: fixing imaging conditions such as the F-number, the optical zoom ratio and the like of the imaging lens unit 1 under the control of an imaging control unit (not shown in the drawings); and imaging a predetermined object for the correction information calculation processing (for example, a white light or the like) under conditions such that light amounts incident on the imaging optical system of the imaging lens unit 1 (more specifically, at least a region overlapping the imaging region of the electronic imaging unit 2 in the optical axis direction) are substantially uniform.

The image acquisition unit 51 then acquires image data (for example, RGB image data, YUV image data or the like) of the predetermined object image P1 that has been outputted from the electronic imaging unit 2 and converted by the unit circuit unit 3.

The image acquisition unit 51 also acquires image data for generating a single-shot image, an HDR image—by pixel addition processing with exposure bracketing—or the like in accordance with pressing of a shutter button by a user.

On the basis of the pixel values of the image of the predetermined object that is acquired by the image acquisition unit 51, the first calculation unit 52 calculates co-ordinates (xc,yc) of a center C of a luminance contour distribution D, which is a distribution of strengths of the pixel values.

Figure 3A:
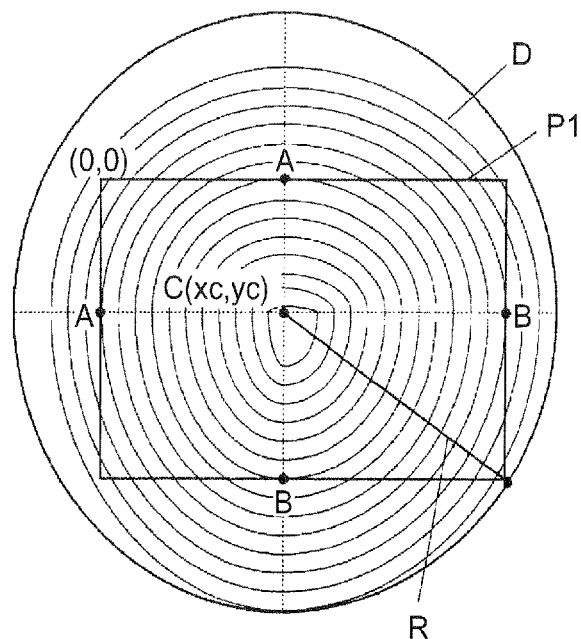
FIG. 3A is a diagram schematically showing an image circle of an imaging lens unit of the imaging device of FIG. 1.

That is, on the basis of the pixel values of respective pixels in the image data of the predetermined object image P1 acquired by the image acquisition unit 51, the first calculation unit 52 generates the luminance contour distribution D, in which the pixel values are represented as heights (see FIG. 3A).

These pixel values are, for example, data of the respective color components of respective pixels in RGB image data, luminance values Y of respective pixels in YUV image data, or the like.

Figure 3B:
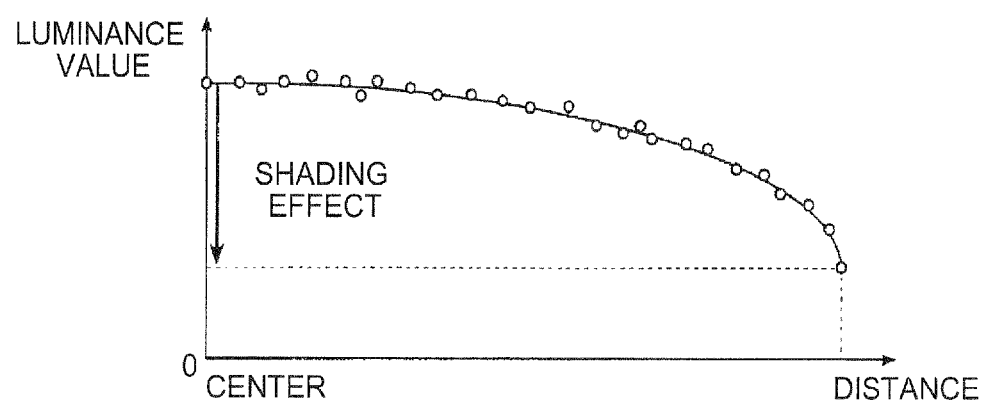
FIG. 3B is a diagram schematically showing a distribution of contours if pixel values of an image of a predetermined object captured by the imaging device of FIG. 1 are represented as heights.

For example, if luminance values Y are employed as the pixel values, then, as shown in FIG. 3A and FIG. 3B, the center of the imaging optical system of the imaging lens unit 1 has the highest luminance values (is brightest), and the luminance values decrease away from the center toward the periphery (the shading effect).

FIG. 3B schematically represents samples of the luminance values Y of plural pixels that are spaced by a predetermined interval along a line R shown in FIG. 3A, which joins the center with an edge portion.

The luminance contour distribution D is a distribution of luminance values expressing the shading effect, which is notionally represented on the basis of strengths (magnitudes) of pixel values of pixels in the image data of the predetermined object image P1, and is actually apparent in image data of the predetermined object image P1.

The meaning of the expression "the first calculation unit 52 generates the luminance contour distribution D" as used herein includes the fact of shading occurring in the image of the predetermined object. That is, the first calculation unit 52 includes a shading detection function.

On the basis of the pixel values of plural pixels along a horizontal direction (one direction) of the predetermined object image P1, the first calculation unit 52 calculates a center of gravity xc of the luminance contour distribution D in the horizontal direction, and on the basis of the pixel values of plural pixels along a vertical direction (another direction, which is substantially orthogonal to the one direction) of the predetermined object image P1, the first calculation unit 52 calculates a center of gravity yc of the luminance contour distribution D in the vertical direction.

Then, on the basis of the respective centers of gravity xc and yc of the predetermined object image P1 in the horizontal direction and vertical direction, the first calculation unit 52 calculates the co-ordinates (xc,yc) of the center C of the luminance contour distribution D, to serve as a reference position.

In the following descriptions, co-ordinates are expressed with, as an example, the top-left corner of the predetermined object image P1 serving as an origin (0,0).

When the first calculation unit 52 is calculating the center of gravity in the horizontal direction (x-axis direction) of the luminance contour distribution D, on the basis of the pixel values (for example, luminance values Y) of pixels of the image data of the predetermined object image P1, the first calculation unit 52 specifies the pixel values of pixels at the endpoints A and B of a predetermined line X in the horizontal direction.

Specifically, the first calculation unit 52 specifies the predetermined line X, which extends in the horizontal direction, as being at a predetermined position (for example, a substantially central portion) in the vertical direction (y-axis direction), and acquires the pixel values of the pixels at the endpoints A and B of this line X.

The first calculation unit 52 compares the pixel values of the pixels at the endpoints A and B with one another. If these pixel values are determined to be equal to one another, the first calculation unit 52 decides that the peripheral light amount drop-offs are symmetrical in the horizontal direction (left-right symmetry), and sets the midpoint of the line X as the center of gravity xc.

Figure 4A:
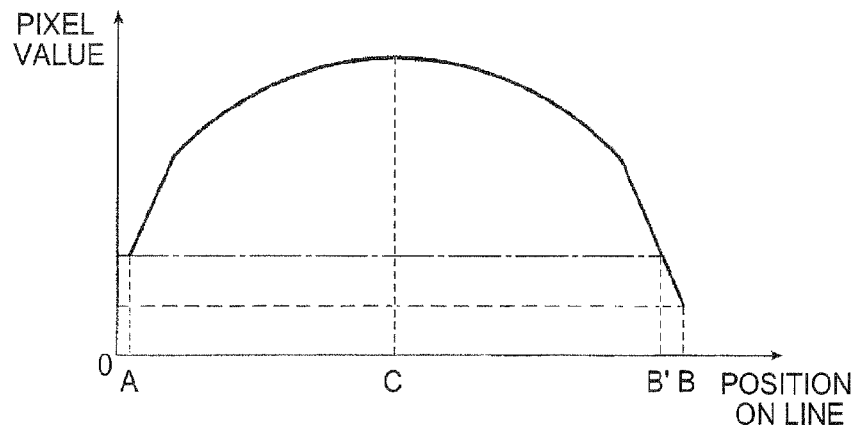
FIG. 4A is a diagram for describing processing that calculates a center of the luminance contour distribution in FIG. 3A.

On the other hand, if the first calculation unit 52 determines that the pixel values of the pixels at the endpoints A and B are different, the first calculation unit 52 designates, at the side of the endpoint with the lower pixel value (for example, in FIG. 4A, endpoint B), a position (for example, point B') that has a pixel value equal to the pixel value of the pixel at the other endpoint (in the example in FIG. 4A, endpoint A), and sets the midpoint between this position (point B') and the other endpoint (endpoint A) as the center of gravity xc.

Then, for the vertical direction (y-axis direction) of the luminance contour distribution D, the first calculation unit 52 calculates the center of gravity yc of a predetermined line Y in the vertical direction.

The method of calculating the center of gravity yc is substantially the same as the above-described method of calculating the center of gravity xc; the details are not described here.

Figure 4B:
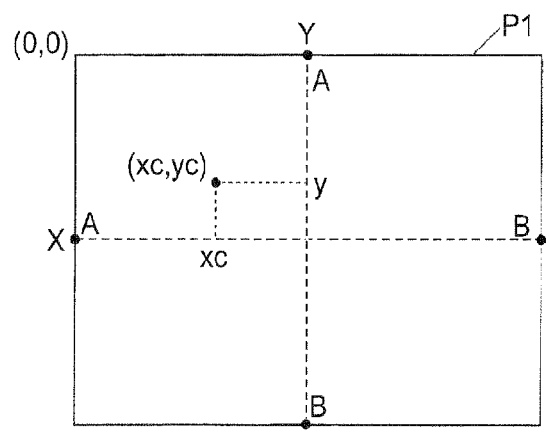
FIG. 4B is a diagram for describing specification of a center C of the luminance contour distribution D of FIG. 3A.

Then the first calculation unit 52 specifies the co-ordinates (xc,yc) of the center C of the luminance contour distribution D, that is, of a shading center C, as being the horizontal direction center of gravity xc and the vertical direction center of gravity yc of the predetermined object image P1 that have been calculated as described above (see FIG. 4B).

In the calculations of the center of gravity xc of the line X and the center of gravity yc of the line Y, averages of pixel values of neighboring pixels within predetermined ranges centered on the pixels of the respective endpoints A and B of the lines X and Y may be used. Thus, the effects of noise in the image data of the predetermined object image P1 may be moderated.

Figure 4C:
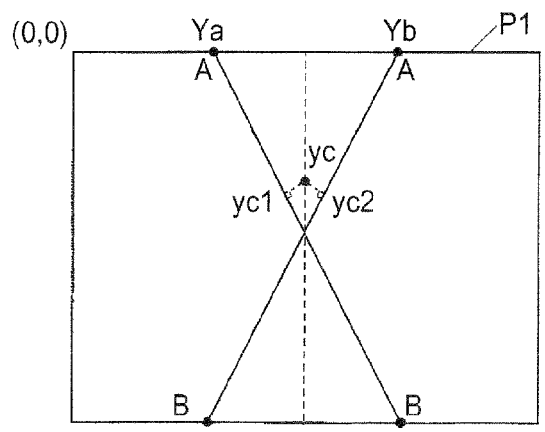
FIG. 4C is a diagram for describing specification of the center C of the luminance contour distribution D of FIG. 3A by a different method.

When calculating the center of gravity in the shorter direction of the substantially rectangular predetermined object image P1, that is, when calculating the vertical direction center of gravity yc, the first calculation unit 52 may calculate the center of gravity yc of the luminance contour distribution D in the vertical direction (the other direction, which is substantially parallel with the shorter sides) on the basis of pixel values of plural pixels arrayed along two lines Ya and Yb that pass through the center of the substantially rectangular predetermined object image P1 and extend in directions that are angled with respect to the shorter sides and the longer sides of the predetermined object image P1 (see FIG. 4C).

Specifically, the first calculation unit 52 calculates centers of gravity yc1 and yc2 of the two lines Ya and Yb in the same manner as described above, and calculates a point at which perpendicular lines drawn from the centers of gravity yc1 and yc2 intersect as being the vertical direction center of gravity yc.

Thus, on the basis of pixel values of the predetermined object image P1 acquired by the image acquisition unit 51, the first calculation unit 52 calculates the reference position in the distribution of strengths of pixel values (the luminance contour distribution D).

The second calculation unit 53 calculates a correction gain reference table T ("correction information" hereinafter) for shading correction of the pixel values (for example, luminance values Y) of plural pixels in the image information outputted from the electronic imaging unit 2, with reference to distances from the shading center C of the predetermined object image P1 toward each of four corner portions of the predetermined object image P1, at the top left, the top right, the bottom left and the bottom right.

Specifically, the second calculation unit 53 is equipped with a central gain calculation unit 531, a correction coefficient calculation unit 532, a provisional correction gain calculation unit 533 and a provisional correction gain designation unit 534.

The central gain calculation unit 531 calculates a pixel value at the center C of the luminance contour distribution D of the predetermined object image P1, which is to say the shading center C, as being a correction gain (a central gain) to be a reference for calculating correction gains for shading correction.

For the calculation of the central gain, an average of pixel values of neighboring pixels within a predetermined range centered on a pixel at the shading center C may be used. Thus, the effects of noise in the image data of the predetermined object image P1 may be moderated.

The correction coefficient calculation unit 532 calculates distance correction coefficients corresponding to distances from the shading center C.

That is, on the basis of pixel values of pixels in the image data of the predetermined object image P1, the correction coefficient calculation unit 532 acquires the pixel values of plural pixels arranged in respective directions to up, down, left and right from the shading center C, spaced by predetermined intervals (for example, intervals between pixels at a time of shading correction or the like).

Then, by performing predetermined computations with reference to the central gain calculated by the central gain calculation unit 531, the correction coefficient calculation unit 532 calculates correction gains for shading correction corresponding to pixel values in a pixel value series, which is formed of pixel values of plural pixels, in each of the directions to up, down, left and right.

Thus, the correction coefficient calculation unit 532 calculates a sample series formed of correction gains for shading correction for each of the directions up, down, left and right. The sample series of correction gains in each direction to up, down, left or right has a shape similar to a curve in which the correction gain increases with increasing distance from the shading center C (see FIG. 6B).

The intervals at which the pixel values of plural pixels along the respective directions to up, down, left and right from the shading center C are acquired are not limited to the intervals between pixels at the time of shading correction, but may be arbitrarily altered as appropriate, provided the pixel intervals are such that sufficient accuracy for calculating a distance correction coefficient in each of the directions up, down, left and right can be obtained.

Next, of the sample series in the respective directions to up, down, left and right, the correction coefficient calculation unit 532 sets a distance correction coefficient for the direction with the furthest distance from the shading center C (for example, in FIG. 6A, the direction to the right) as a reference (a distance correction coefficient of 1.0), and sets the distance correction coefficients in the other directions in accordance with spacings in the luminance contour distribution D.

Specifically, if the spacings in the luminance contour distribution D in a direction of interest are narrow compared to the spacings in the luminance contour distribution D in the direction with the greatest distance from the shading center C (in the example, the cases of the direction up and the direction to the left), the correction coefficient calculation unit 532 sets a distance correction coefficient for the direction of interest such that correction gains in accordance with distances from the shading center C are larger than the reference.

Alternatively, if the spacings in the luminance contour distribution D are wider in the direction of interest (in the example, the case of the direction down), the correction coefficient calculation unit 532 sets a distance correction coefficient for the direction of interest such that correction gains in accordance with distances from the shading center C are smaller than the reference.

Figure 6A:
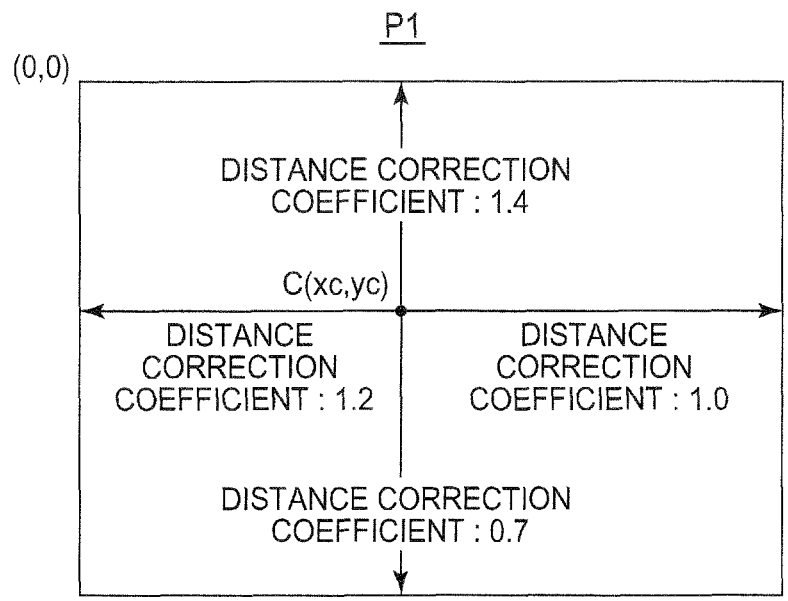
FIG. 6A is a diagram for describing processing that calculates distance correction coefficients in respective directions to up, down, left and right from the center of the luminance contour distribution of FIG. 5.
Figure 6B:
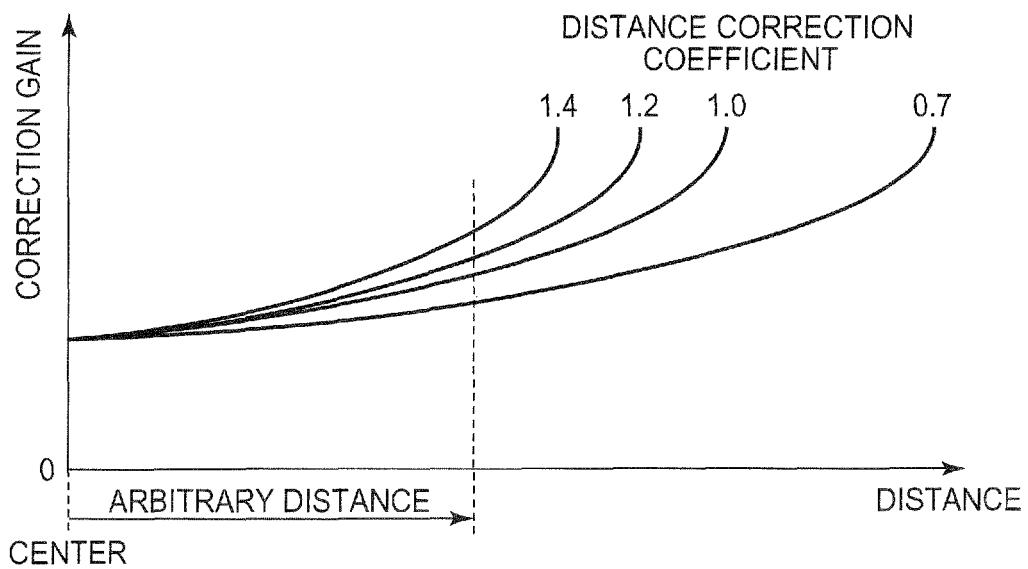
FIG. 6B is a diagram for describing the processing that calculates the distance correction coefficients in the respective directions to up, down, left and right from the center of the luminance contour distribution of FIG. 5.

For example, as illustrated in FIG. 6A, the correction coefficient calculation unit 532 sets the distance correction coefficient in the upward direction in which the spacings in the luminance contour distribution D are narrowest such that the correction gains are largest (in the example, a distance correction coefficient of 1.4), sets the distance correction coefficient in the leftward direction in which the spacings in the luminance contour distribution D are the next narrowest such that the correction gains are the next largest (in the example, a distance correction coefficient of 1.2), and sets the distance correction coefficient in the downward direction, in which the spacings in the luminance contour distribution D are wider than in the direction with the greatest distances from the shading center C, such that the correction gains are smaller than the reference (in the example, a distance correction coefficient of 0.7).

In the calculation of the distance correction coefficients, sample series of correction gains in each of the directions up, down, left and right are used as references. However, for example, pixel value series formed of the pixel values of plural pixels in each of the directions up, down, left and right that are used for the calculation of the sample series may be used as references.

Figure 5:
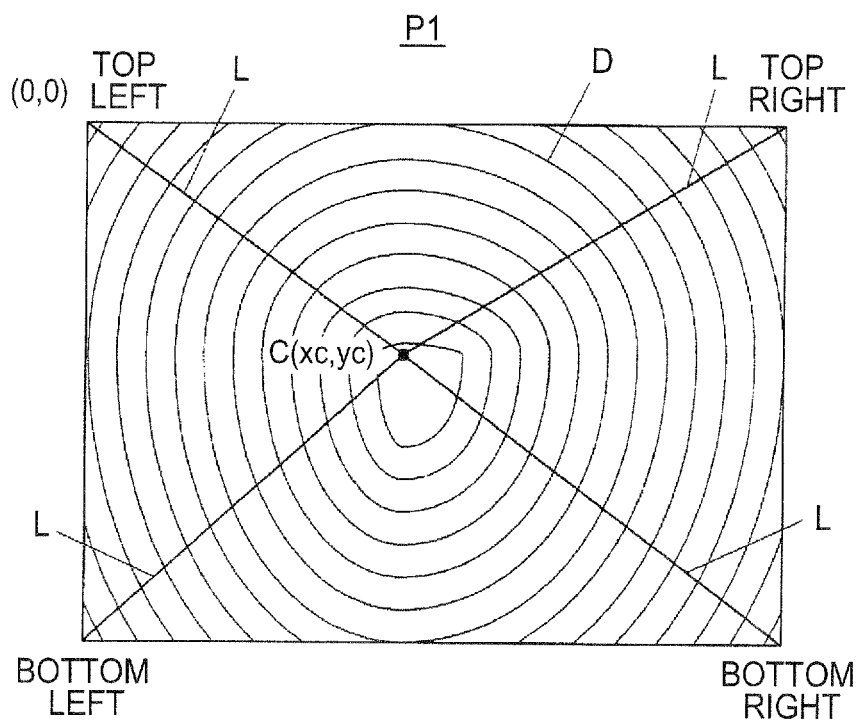
FIG. 5 is a diagram schematically showing respective lines joining corner portions with the center of the luminance contour distribution of the image of the predetermined object.

For lines L in four diagonal directions joining the shading center C with the four corners of the predetermined object image P1 (see FIG. 5), the provisional correction gain calculation unit 533 calculates respective provisional correction gains for shading correction of the pixel values of plural pixels along the lines L.

That is, on the basis of respective pixel values of pixels in the image data of the predetermined object image P1, the provisional correction gain calculation unit 533 acquires pixel values of plural pixels along each of the lines L in the four diagonal directions from the shading center C to the top left, the top right, the bottom left and the bottom right, spaced by predetermined intervals (sampling intervals).

Here, the provisional correction gain calculation unit 533 calculates the sampling intervals of the pixel values of the plural pixels in the four diagonal directions with reference to the distance correction coefficients in the directions up, down, left and right that have been calculated by the correction coefficient calculation unit 532.

Thus, the provisional correction gain calculation unit 533 calculates respective sample series of provisional correction gains (provisional correction information) for shading correction of the pixel values of plural pixels along the lines P joining the shading center C with the corner portions of the predetermined image.

For the calculation of the provisional correction gains, an average of Pixel values of neighboring pixels within a predetermined range centered on each pixel may be used. Thus, the effects of noise in the image data of the predetermined object image P1 may be moderated.

The provisional correction gain designation unit 534 designates, from the sample series of provisional correction gains in the four diagonal directions that have been calculated by the provisional correction gain calculation unit 533, a sample series of provisional correction gains in one of the diagonal directions.

Specifically, the provisional correction gain designation unit 534 identifies the image height at, of the four corners at the top left, top right, bottom left and bottom right of the predetermined object image P1, the corner that is closest to the shading center C.

Then the provisional correction gain designation unit 534 designates, of the provisional correction gain sample series in the four diagonal directions, the sample series in the diagonal direction that has the smallest provisional correction gain at the identified image height.

Figure 7:
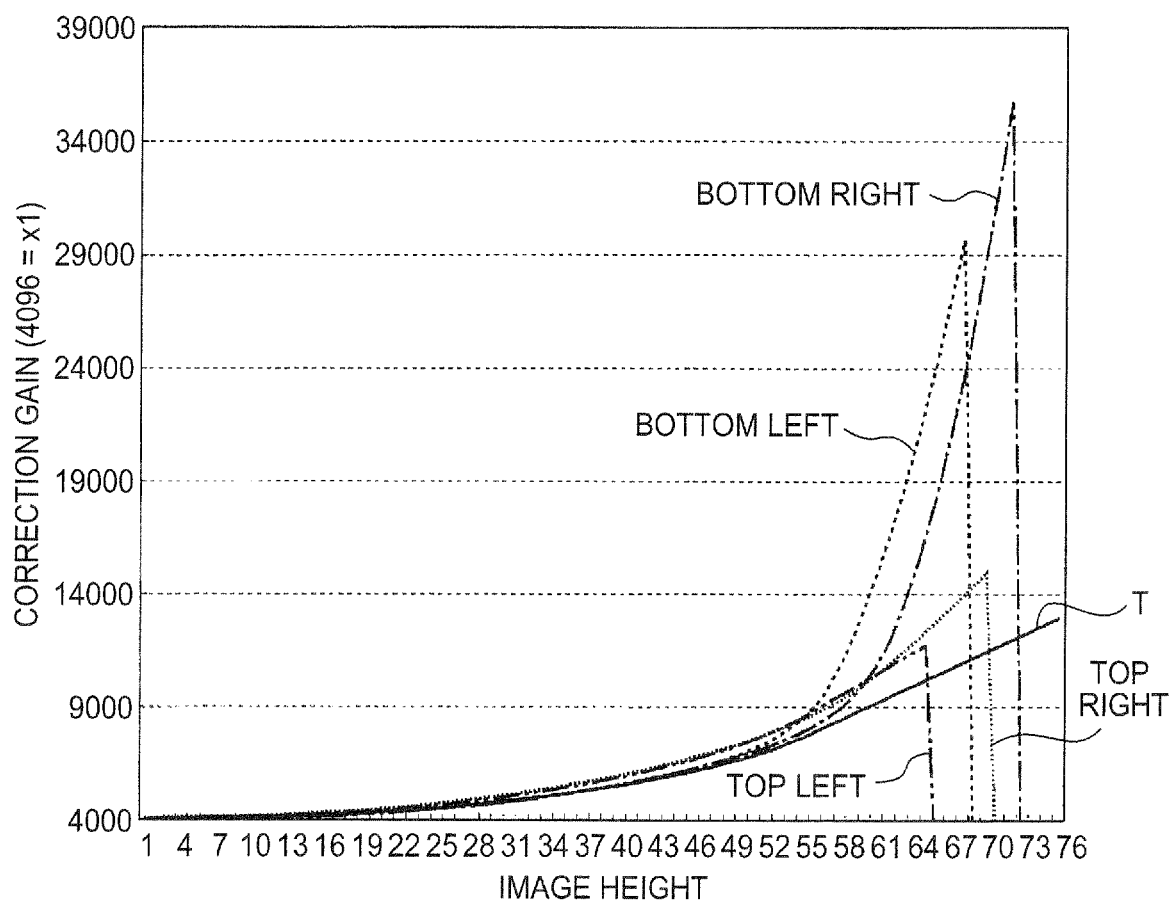
FIG. 7 is a graph showing provisional correction gains in diagonal directions and correction gains in a reference table that are calculated by the imaging device of FIG. 1.

For example, FIG. 7 shows provisional correction gains in the diagonal directions for each of the predetermined sampling intervals (correction intervals) and a reference table T (described below). The provisional correction gain sample series in the top-left direction has image heights only up to the vicinity of 64. In this case, the provisional correction gain designation unit 534 identifies the top-left corner as being the corner closest to the shading center C.

The provisional correction gain sample series in the top-left direction has the smallest provisional correction gain at the image height 64. Therefore, the provisional correction gain designation unit 534 designates the provisional correction gain sample series in the top-left direction as being the diagonal direction provisional correction gain sample series with the smallest provisional correction gains.

Thus, of the provisional correction gain sample series (provisional correction information) corresponding to the lines L in the diagonal directions that have been calculated by the provisional correction gain calculation unit 533, the provisional correction gain designation unit 534 designates the provisional correction gain sample series (provisional correction information) in the one direction that has the smallest provisional correction gain (correction value) corresponding to the distance of the corner that is closest to the shading center C.

Then, by reference to the provisional correction gain sample series in the one direction that has been designated by the provisional correction gain designation unit 534, the second calculation unit 53 calculates a correction gain reference table T for shading correction.

Specifically, the second calculation unit 53 amends the provisional correction gain sample series in the one diagonal direction designated by the provisional correction gain designation unit 534 (in the example, the top-left direction) such that, at respective distances from the shading center C (respective image heights), the provisional correction gain (correction value) of the provisional correction gain sample series in the one diagonal direction does not exceed the provisional correction gains of the provisional correction gain sample series in the other three diagonal directions.

For example, as shown in FIG. 7, with the top-left direction provisional correction gain sample series, a gain inversion effect occurs in which the provisional correction gains in other diagonal directions are lower in a small region below the image height of 64 (in the example, image heights of around 50 to 60).

Accordingly, the provisional correction gains in the top-left direction provisional correction gain sample series are suppressed to a level such that the gain inversion effect does not occur (for example, around 70 to 80%).

The second calculation unit 53 then calculates the amended provisional correction gain sample series in the one diagonal direction to serve as the correction gain reference table T for shading correction (see FIG. 7).

In the present embodiment, the correction information calculation unit 5 performs the processing described above for each of the color components in the image data, and obtains a correction gain reference table T for each color component.

That is, the correction information calculation unit 5 obtains a correction gain reference table T for the GR component, the GB component, the R component and the B component of the image data (see FIG. 7).

Herebelow, the correction gain reference table(s) T for the luminance component(s) (the G component or the GR component and the GB component) is/are referred to where appropriate as luminance shading correction coefficients, and the correction gain reference tables T for the other color components (the R component and the B component) are referred to where appropriate as color shading correction coefficients.

If the provisional correction gain sample series of the one diagonal direction designated by the provisional correction gain designation unit 534 is shorter than the provisional correction gain sample series of the diagonal direction that is longest from the shading center C, the second calculation unit 53 performs the processing described above and, by linear extrapolation, calculates correction gains at least to the image height of the corner portion that is furthest from the shading center C (in the example, the image height 73 in the bottom-right direction).

In this case, taking account of arithmetic errors and the like, the second calculation unit 53 may calculate correction gains to beyond the image height of the corner portion furthest from the shading center C (for example, an image height of around 76).

Thus, by reference to the distances from the shading center C of the predetermined object image P1 to the corners of the predetermined object image P1 that have been calculated by the first calculation unit 52, the second calculation unit 53 calculates the correction gain reference table T (correction information) for shading correction of the pixel values of plural pixels in the image information outputted from the electronic imaging unit 2.

In the present embodiment, the second calculation unit 53 alters the correction gains for shading correction of each color component in accordance with an imaging mode: an imaging mode that generates a high dynamic range (HDR) image by successively shooting the same frame with different exposure times and performing pixel addition processing (hereinafter referred to as the HDR mode); or an imaging mode that generates a single-shot image with a usual dynamic range by imaging one frame with a single exposure time (hereinafter referred to as the single-shot mode).

Specifically, in the single-shot mode, by reference to the correction gain reference tables T (correction information) of the respective color components, the second calculation unit 53 generates respective correction gain tables for the color components of image information to be outputted from the electronic imaging unit 2, by applying pre-specified computations for each of the aperture value, optical zoom ratio and the like of the imaging lens unit 1.

On the other hand, in the HOP mode, for the correction gain reference tables T (correction information) of the color components, the second calculation unit 53 sets the correction gains of the luminance component (the G component) to a value of 1 and alters the correction gains of the other color components in proportion to changes in the luminance component correction gains.

Then, by reference to the altered correction gains, the second calculation unit 53 applies pre-specified computations for each of the aperture value, optical zoom ratio and the like of the imaging lens unit 1 and generates respective correction gain tables for the color components of image information to be outputted from the electronic imaging unit 2.

Figure 8A:
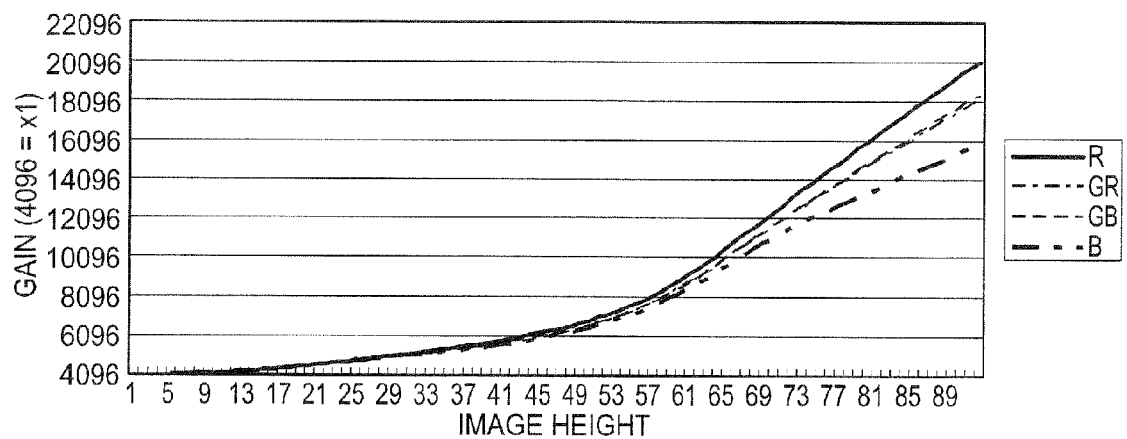
FIG. 8A is a diagram illustrating respective correction gain tables for color components in a single-shot mode.

FIG. 8A is a diagram illustrating the respective correction gain tables for the color components in the single-shot mode. In FIG. 8A, the GR component and the GB component, which serve as the luminance component, are shown separately. (These may be collectively treated as the G component.)

As shown in FIG. 8A, for the single-shot mode, correction gain tables are specified for the luminance components (the GR component and the GB component) and the color components (the R component and the B component) by reference to the correction gain reference tables T.

Figure 8B:
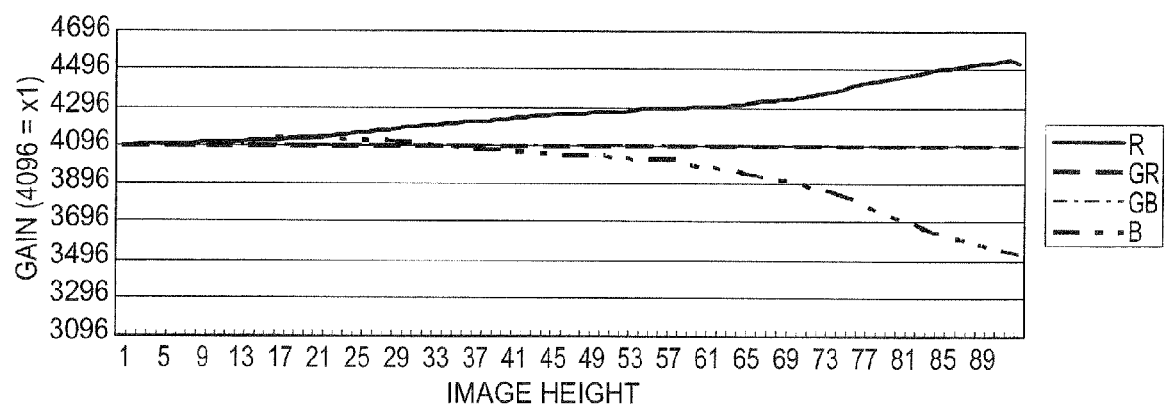
FIG. 8B is a diagram illustrating respective correction gain tables for color components in an HDR mode.

FIG. 8B is a diagram illustrating respective correction gain tables for color components in the HDR mode. In FIG. 8B, the correction gain tables are specified with the correction gains for the luminance components (the GR component and the GB component) being set to 1 over all image heights, and the ratio of each color component to the luminance component at each height (the ratio of the R component to the GR component and the ratio of the B component to the GB component) being specified as a correction gain.

Because the correction gain tables are prepared thus, when an image is captured in the HDR mode, shading correction is implemented such that the color balance is maintained for each color component, without shading correction being applied to the luminance components.

Pixel addition of plural sets of image data (sets of image data with different exposure times) is performed in the state in which the balance of the color components with respect to the luminance components in each set is maintained in this manner. Thus, an HDR image is generated.

If the GR component and the GB component are together treated as the G component, the correction gain tables are specified with ratios of the R component and the B component to the G component serving as correction gains.

The image processing unit 6 is equipped with a correction information storage unit 61 and a correction processing unit 62.

The correction information storage unit 61 stores the correction gain reference tables T for shading correction of each color component that have been calculated by the second calculation unit 53 of the correction information calculation unit 5.

The correction information storage unit 61 also stores the co-ordinates of the shading center C and the up, down, left and right distance correction coefficients in relation with the correction gain tables.

During shading correction processing in the present embodiment, the correction processing unit 62, which is described below, calculates respective correction gains for the image information outputted from the electronic imaging unit 2 on the basis of the correction gain reference tables T, for each aperture and optical zoom ratio or the like of the imaging lens unit 1.

In addition to the correction gain reference tables T for shading correction, plural correction gain tables in which the correction gains are altered in accordance with the aperture and optical zoom ratio or the like of the imaging lens unit 1 may be calculated in advance and stored in the correction information storage unit 61.

The correction processing unit 62 applies shading correction to image information outputted from the electronic imaging unit 2.

That is, the correction processing unit 62 performs shading correction in which image data of a captured image that is outputted from the electronic imaging unit 2 and generated by the unit circuit unit 3 when an object is imaged is multiplied by predetermined correction gains in accordance with the aperture and optical zoom ratio or the like of the imaging lens unit 1.

This shading correction is processing that corrects color irregularities in the data of each color component of the pixels in RGB image data of the captured image (chroma shading), processing that corrects luminance irregularities of luminance values Y of pixels in YUV image data of the captured image (luminance shading), or the like.

In the present embodiment, the shading correction processing is applied to RGB image data.

Specifically, first, when predetermined operation signals relating to instructions designating an image mode (the single shot mode or the HDR mode), an optical zoom ratio, an aperture value and the like are inputted in accordance with predetermined operations by a user of the operation input unit 10, the central control unit 11 specifies the position of the zoom adjustment lens in the optical axis direction and the aperture value and the like in accordance with the designation instructions.

Then the central control unit 11 outputs predetermined instruction signals relating to the specified zoom adjustment lens position in the optical axis direction, aperture value and the like to the correction processing unit 62 of the image processing unit 6.

In accordance with the zoom adjustment lens position in the optical axis direction, aperture value and the like, the correction processing unit 62 reads out the correction gain reference tables T for shading correction of each color component that have been stored in the correction information storage unit 61.

The correction processing unit 62 also reads out the shading center C co-ordinates and up, down, left and right distance correction coefficients that have been stored in the correction information storage unit 61.

The correction processing unit 62 refers to the correction gain reference table T for each color component, and performs pre-specified computations for each of the aperture, the optical zoom ratio and the like of the imaging lens unit 1. Thus, respective correction gain tables for the color components for the image information outputted from the electronic imaging unit 2 are generated.

At this time, as described below, the correction processing unit 62 executes shading correction processing that differs between a case of single-shot imaging and a case of imaging for generating an HDR image.

The correction processing unit 62 then performs the shading correction by calculating a correction gain for each pixel of the captured image generated by the unit circuit unit 3—from the distance of the pixel from the shading center C, the up, down, left and right distance correction coefficients and the correction gain tables for shading correction—and multiplying these correction gains by the pixel values of the pixels.

The correction processing unit 62 outputs the image data of the captured image to which the shading correction has been applied to the central control unit 11 as a processed image.

The correction processing unit 62 may be provided separately from the central control unit 11 and perform processing that reads out correction gain tables for shading correction from the correction information storage unit 61 in accordance with the zoom adjustment position in the optical axis direction, the aperture value and the like.

Thus, the correction processing unit 62 may apply the shading correction to the image information outputted from the electronic imaging unit 2 on the basis of the correction information for shading correction of each color component that has been calculated by the second calculation unit 53.

When image data of a captured image is to be recorded, the image processing unit 6 receives the image data outputted from the central control unit 11, applies various kinds of image processing, compression and the like to the image data, and puts the image data into a file format. The image processing unit 6 then outputs the file format image data to the image recording unit 9.

The display control unit 7 reads out image data for display that has been temporarily stored in the memory 4, and controls the display unit 8 to display the image data.

Specifically, the display control unit 7 is provided with VRAM, a VRAM controller, a digital video encoder and the like (none of which are shown in the drawings).

Luminance signals Y and color difference signals Cb and Cr are read from the memory 4 under the control of the central control unit 11 and recorded in the VRAM.

The digital video encoder periodically reads these signals from the VRAM via the VRAM controller, generates video signals based on this data, and outputs the video signals to the display unit 8.

The display unit 8 is, for example, a liquid crystal display device. The display unit 8 displays images captured by the electronic imaging unit 2 and the like at a display screen in accordance with the video signals from the display control unit 7. Specifically, in a still image capture mode or a video image capture mode, the display unit 8 displays a live-view image with plural image frames generated by imaging of an object by the electronic imaging unit 2 being successively updated at a predetermined frame rate.

The image recording unit 9 is constituted with, for example, non-volatile memory and the like. The image recording unit 9 records still image data for recording that has been encoded in a predetermined compression format by an encoding unit (not shown in the drawings) of the image processing unit 6, video image data formed of plural image frames, and the like.

The operation input unit 10 is for predetermined operations of the imaging device 100. Specifically, the operation input unit 10 is provided, with a shutter button for object imaging instructions, a selection and setting button for instructions for selecting the imaging mode, functions and the like, a zoom button for zoom amount adjustment instructions, and so forth (none of which are shown in the drawings). Predetermined operation signals are outputted to the central control unit 11 in response to the operation of these buttons.

The central control unit 11 controls the various units of the imaging device 100. Specifically, although not shown in the drawings, the central control unit 11 is provided with a central processing unit (CPU), random access memory (RAM) and read-only memory (ROM). The central control unit 11 performs various control operations in accordance with various processing programs (not shown in the drawings) of the imaging device 10C.

Now, the correction information calculation processing for shading correction that is carried out by the imaging device 100 is described with reference to FIG. 9.

Figure 9:
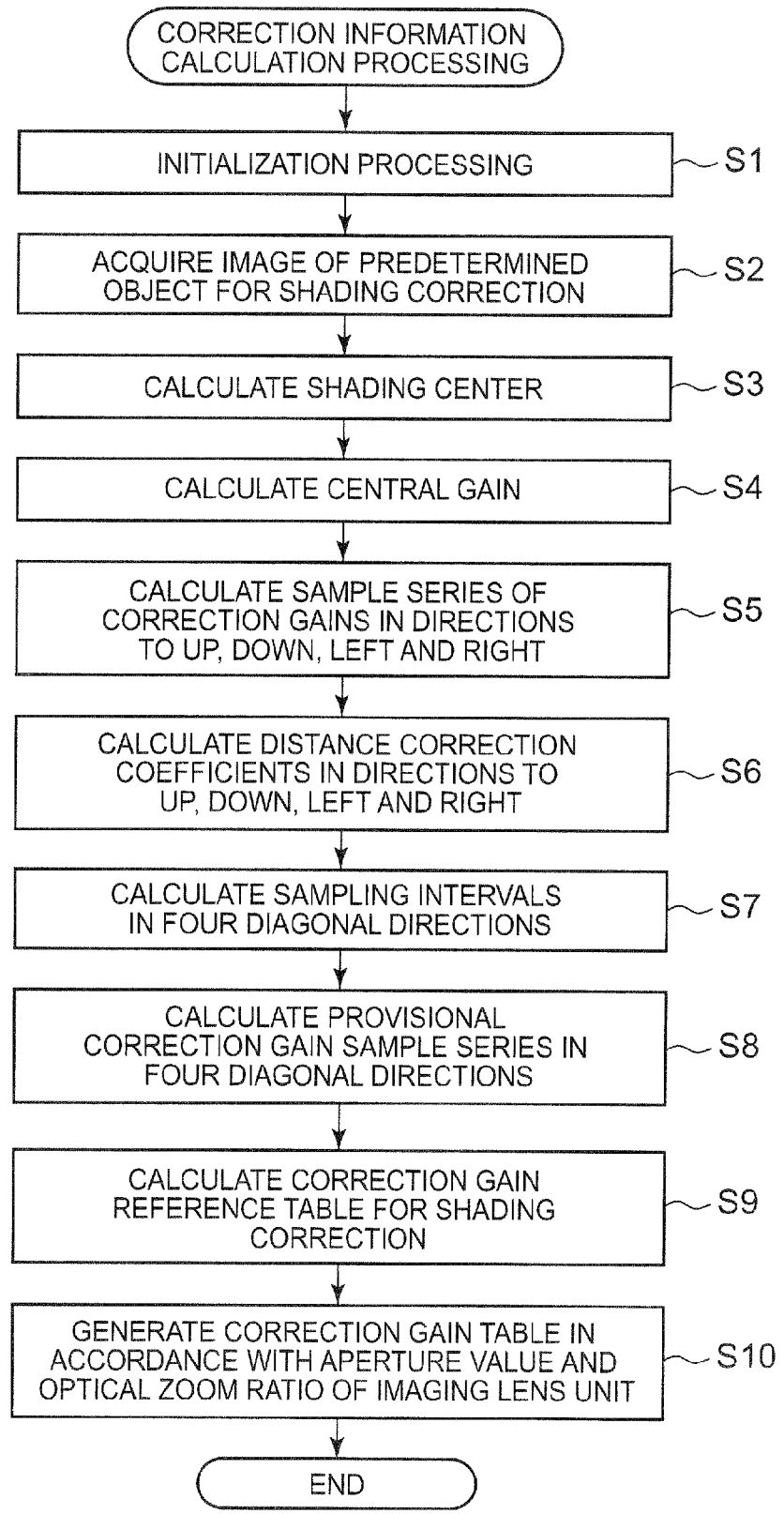
FIG. 9 is a flowchart showing an example of operations according to correction information calculation processing.

FIG. 9 is a flowchart showing an example of operations according to the correction information calculation processing.

The flowchart shown in FIG. 9 is executed for each color component of the image data. Thus, a correction gain reference table T for shading correction (correction information) is generated for each color component.

As shown in FIG. 9, the correction processing unit 62 of the image processing unit 6 initializes (step S1) the information stored in the correction information storage unit 61 (for example, correction gain reference tables T for shading correction and the like). Then, the image acquisition unit 51 of the correction information calculation unit 5 acquires the predetermined object image P1 for shading correction that has been imaged by the imaging lens unit 1 and electronic imaging unit 2 (step S2).

As a specific example, imaging conditions such as the F-number, the optical zoom ratio and the like of the imaging lens unit 1 are fixed and, under conditions such that incident light amounts on the whole of the lens of the imaging lens unit 1 are substantially uniform, a predetermined object (for example, white light or the like) is imaged by the electronic imaging unit 2. Then, image data of the predetermined object image P1 that has been converted by the unit circuit unit 3 (for example, RGB image data, YUV image data or the like) is acquired by the image acquisition unit 51.

Next, on the basis of the pixel values of the predetermined object image P1 acquired by the image acquisition unit 51, the first calculation unit 52 generates a contour distribution D, which is a distribution of strengths of the pixel values, and then calculates the center C of the luminance contour distribution D, that is, co-ordinates (xc,yc) of a shading center C (step S3).

Specifically, the first calculation unit 52 calculates the horizontal direction center of gravity xc of the luminance contour distribution D of the predetermined object image P1, and calculates the vertical direction center of gravity yc of the luminance contour distribution D of the predetermined object image P1. Then the first calculation unit 52 specifies the calculated horizontal direction center of gravity xc of the predetermined object image P1 and the calculated vertical direction center of gravity yc as being the co-ordinates (xc,yc) of the shading center C.

Next, the central gain calculation unit 531 of the second calculation unit 53 calculates a pixel value of the shading center C of the predetermined object image P1 (step S4) to serve as a central gain, which is a reference for calculation of the correction gains for shading correction.

Then, the correction coefficient calculation unit 532 the second calculation unit 53 calculates respective sample series formed of correction gains for shading correction in the directions to up, down, left and right (step S5).

Specifically, on the basis of the pixel values of the pixels of the image data of the predetermined object image P1, the correction coefficient calculation unit 532 acquires pixel values of plural pixels arrayed in the directions to up, down, left and right from the shading center C, spaced by predetermined intervals.

Then, by reference to the central gain calculated by the central gain calculation unit 531, the correction coefficient calculation unit 532 calculates correction gains for shading correction that correspond to pixel values in Pixel value series formed of plural pixel values in the directions to up, down, left and right. Thus, the correction coefficient calculation unit 532 respectively calculates the sample series formed of correction gains for shading correction in the directions to up, down, left and right.

Then the correction coefficient calculation unit 532 respectively calculates distance correction coefficients for correcting the correction gains for shading correction in accordance with distances from the shading center C, for the directions to up, down, left and right (step S6).

Specifically, of the sample series in the directions to up, down, left and right, the correction coefficient calculation unit 532 sets the distance correction coefficient of the direction with the greatest distance from the shading center C (for example, the rightward direction in FIG. 6A) as a reference (a distance correction coefficient of 1.0), and sets the distance correction coefficients of the other directions in accordance with spacings of the luminance contour distribution D.

That is, if the spacings in the luminance contour distribution D in a direction of interest are narrower than the reference spacings, the correction coefficient calculation unit 532 sets the distance correction coefficient such that correction gains are larger than the reference in accordance with distances from the shading center C.

On the other hand, if the spacings in the luminance contour distribution D in a direction of interest (for example, the downward direction or the like) are wider than the reference spacings, the correction coefficient calculation unit 532 sets the distance correction coefficient such that correction gains are smaller than the reference in accordance with distances from the shading center C.

Next, the provisional correction gain calculation unit 533 of the second calculation unit 53 respectively calculates sampling intervals of the pixel values of plural pixels in four diagonal directions from the shading center C to the top left, the top right, the bottom left and the bottom right of the imaging region of the electronic imaging unit 2 (step S7).

Specifically, the provisional correction gain calculation unit 533 calculates sampling intervals of the pixel values of plural pixels arranged along one of the diagonal directions, by reference to the distance correction coefficients in the two directions that are separated by the diagonal direction in which sampling intervals are to be found.

That is, of the two directions into which one diagonal direction (for example, the direction to top right) resolves (in the example, the rightward direction and the upward direction), the provisional correction gain calculation unit 533 calculates an x co-ordinate x1 for specification of a sampling interval in the x-axis direction by reference to the distance correction coefficient in the direction parallel to the horizontal direction (in the example, the rightward direction), and calculates a y co-ordinate y1 for specification of a sampling interval in the y-axis direction by reference to the distance correction coefficient in the direction parallel to the vertical direction (in the example, the upward direction).

Then, on the basis of the x co-ordinate x1 and the y co-ordinate y1, the provisional correction gain calculation unit 533 calculates an ellipse that passes through the two points (x1,0) and (0,y1), and calculates the co-ordinates (xi,yi) of an intersection point I between this ellipse and a line I in the diagonal direction from the shading center C to the corner portion (in the example, the top-right corner). The co-ordinates (xi,yi) serve as the sampling interval.

Next, the provisional correction gain calculation unit 533 respectively calculates sample series formed of provisional correction gains for shading correction of the pixel values of plural pixels in the four diagonal directions (step S8).

Specifically, on the basis of the pixel values of pixels of the image data of the predetermined object image P1, the provisional correction gain calculation unit 533 sequentially acquires the pixel values of plural pixels arranged along the line L in each of the four diagonal directions, with the sampling intervals in the x-axis direction being intervals of xi pixels and the sampling intervals in the y-axis direction being intervals of yi pixels.

Then, by reference to the central gain calculated by the central gain calculation unit 531, the provisional correction gain calculation unit 533 calculates provisional correction gains for shading correction that correspond to the pixel values of the pixel value series formed of plural pixel values in the four diagonal directions, and respectively calculates sample series formed of provisional correction gains for shading correction in the four diagonal directions.

Then the second calculation unit 53 calculates the correction gain reference table T for shading correction (step S9).

Specifically, of the provisional correction gain sample series in the four diagonal directions that have been calculated by the provisional correction gain calculation unit 533, the provisional correction gain designation unit 534 of the second calculation unit 53 designates the sample series of provisional correction gains in one of the diagonal directions.

That is, of the four corner portions at the top left, top right, bottom left and bottom right of the predetermined object image P1, the provisional correction gain designation unit 534 designates the image height of the corner portion closest to the shading center C, and the provisional correction gain designation unit 534 designates, of the sample series in the four diagonal directions, the sample series in the diagonal direction that has the smallest provisional correction gain at the designated image height (for example, the direction to the top left).

Next, for each of distances from the shading center C, the second calculation unit 53 amends the sample series of provisional correction gains in the diagonal direction designated by the provisional correction gain designation unit 534 (in the example, the direction to the top left) such that the provisional correction gains in the sample series of provisional correction gains in the one diagonal direction do not exceed the provisional correction gains of the sample series of provisional correction gains in the other three diagonal directions.

The second calculation unit 53 then calculates the amended provisional correction gain sample series in the one diagonal direction to serve as the correction gain reference table T for shading correction (see FIG. 7).

Thereafter, the correction information storage unit 61 of the image processing unit 6 stores the correction gain reference table T for shading correction, the co-ordinates of the shading center C, and the distance correction coefficients to up, down, left and right that have been calculated by the second calculation unit 53.

Thus, the correction information calculation processing ends.

Now, the shading correction processing carried out by the imaging device 100 is described with reference to FIG. 10.

Figure 10:
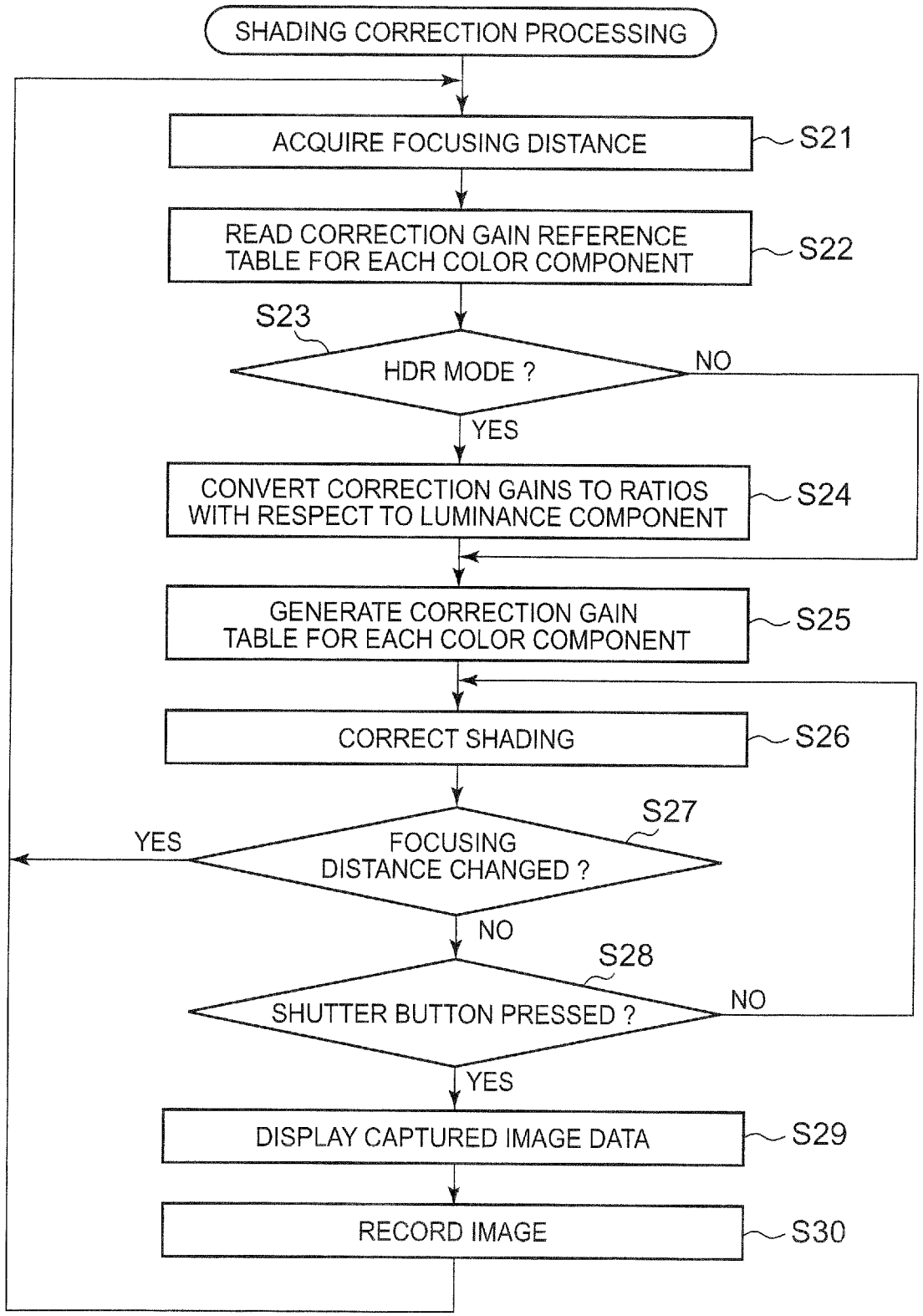
FIG. 10 is a flowchart showing an example of operations according to shading correction processing.

FIG. 10 is a flowchart showing an example of operations according to the shading correction processing.

The shading correction processing applies shading correction to image data, and is a processing sequence that records a shading-corrected image when the shutter button is pressed.

As shown in FIG. 10, the correction processing unit 62 of the image processing unit 6 acquires a focusing distance of the optical system, which is detected by the imaging lens unit 1 (step S21).

Then, the correction processing unit 62 reads out the correction gain reference table T for each color component that has been stored in the correction information storage unit 61 (step S22).

Next, the correction processing unit 62 makes a determination as to whether the imaging mode is the HDR mode or not (step S23).

If the imaging mode is the HDR mode, the result of the determination in step S23 is affirmative. On the basis of the correction gain reference tables T, the correction processing unit 62 sets the correction gains of the luminance component to 1, converts the correction gains of the other color components to ratios relative to the luminance component correction gains, and generates correction gain tables for the respective color components (step S24).

Alternatively, if the imaging mode is the single-shot mode, the result of the determination in step S23 is negative and the processing of the correction processing unit 62 proceeds to step S25.

If the result of the determination of step S23 is negative, or after step S24, the correction processing unit 62 applies the pre-specified computations to the aperture value and optical zoom ratio or the like of the imaging lens unit 1, and generates respective correction gain tables of the color components for the image information outputted from the electronic imaging unit 2 (step S25).

The processing of step S25 generates, depending on the imaging mode, correction gain tables for an HDR image or correction gain tables for the single-shot mode.

Next, the correction processing unit 62 uses the correction gain tables generated in step S25 to apply shading correction to the image data of each color component (step S26).

Specifically, if the imaging mode is the HDR mode, the correction processing unit 62 uses the HDR mode correction gain tables (see FIG. 8B) and multiplies the image data of the luminance component, the R component and the B component with the correction gains.

Here, if the imaging mode is the HDR mode, the processing is executed with a correction gain of 1 for the luminance component (that is, no increase or reduction).

If the imaging mode is the single-shot mode, the correction processing unit 62 uses the single-shot mode correction gain tables (see FIG. 8A) and multiplies the image data of the luminance component, the R component and the B component with the correction gains Hence, a digital image to which shading correction has been applied in accordance with whether the image is an HDR image or a single-shot image is displayed at the display unit 8.

Then, the correction processing unit 62 again acquires the focusing distance detected by the imaging lens unit 1 and, by comparison with the focusing distance acquired in step S21, detects a change in the focusing distance (step S27).

If the result of the comparison is that the two focusing distances do not match, the result of the determination in step S27 is affirmative, and the processing by the correction processing unit 62 returns to step S21.

Thereafter, the correction processing unit 62 repeatedly executes the processing from step S21 to step S25 until the result of the determination in step S27 is negative.

On the other hand, if the result of the comparison is that the two focusing distances do match, the result of the determination in step S27 is negative, and the processing by the correction processing unit 62 proceeds to step S28.

Then, the correction processing unit 62 makes a determination as to whether the shutter button of the operation input unit 10 has been pressed (step S28).

If the result of the determination in step S28 is negative, the processing by the correction processing unit 62 returns to step S26.

Thereafter, the correction processing unit 62 repeatedly executes the processing from step S26 to step S28 until the result of the determination in step S28 is affirmative.

On the other hand, if the result of the determination in step S28 is affirmative, the processing by the correction processing unit 62 proceeds to step S29.

Next, the correction processing unit 62 outputs the digital image to which shading correction has been applied in step S26 to the display unit 8 as image data for imaging (step S29).

Then the correction-processing unit 62 outputs the image data for imaging generated in step S29 to the image recording unit 9 (step S30).

Hence, the image data for imaging is non-volatilely recorded at the image recording unit 9, and is in a state that may be saved to a recording medium or the like.

Thereafter, the correction processing unit 62 executes the above-described sequence of processing from step S21 to step S30 until the power supply is turned off by a user.

As described above, the imaging device 100 of the first embodiment calculates correction gain reference tables T for shading correction for each of color components of image data and, if a single-shot image is captured, performs shading correction of the respective color components of the image with these correction gain reference tables T.

In contrast, in a case of imaging for generating an HDR image, the imaging device 100 calculates ratios between the values of the correction gain reference table T for shading correction of a luminance component and the values of correction gain reference tables T for shading correction of the other color components, sets the correction gains for the luminance component to 1, and performs shading correction of the image data by multiplying the other color components with the correction gains thereof.

Therefore, if the luminance of image data varies, the balance with the other color components does not vary. Therefore, if pixel addition of plural sets of image data with different exposure times is performed to generate an HDR image, then even if white balance adjustment processing is performed, a deterioration in image quality such as color fogging or the like may be suppressed.

As a comparative example, if white balance adjustment processing is applied to image data to which the shading correction according to the present invention has not been applied, the balance between the R component and the G component changes with the adjustment of luminance, and overall color fogging with, for example, blue or the like occurs.

In contrast, in a case of shading correction by ratios between an R component and a GR component and ratios between a B component and a GB component according to the present invention, color fogging does not occur, and colors are proper even after white balance adjustment processing.

The G component corresponding to the luminance component (the GR component and the GB component) is not subjected to shading correction, and levels of correction of the R component, and the B component are small due to being ratios with the GR component and the GB component. Therefore, even when shading correction is applied to the B component and the B component, periphery portions such as the four corners and the like are not excessively corrected and deteriorations in image quality such as whiteouts and the like may be suppressed.

Now, in the present embodiment, the image acquisition unit 51 constitutes an image data acquisition unit and the first calculation unit 52 constitutes a shading detection unit.

The second calculation unit 53 constitutes a luminance shading correction coefficient generation unit and a color difference shading correction coefficient generation unit, and the central control unit 11 constitutes a mode setting detection unit.

The correction processing unit 62 constitutes a first correction unit and a second correction unit, and the second calculation unit 53 constitutes a conversion unit.

In the above first embodiment, a constitution in which the correction processing unit 62 is provided is illustrated. However, this is an example and is not limiting. Arbitrary alterations such as providing or not providing the correction processing unit 62 may be made as appropriate.

For example, in the above embodiment, the correction processing unit 62 is described as carrying out the sequence of processing that includes shading correction. However, some or all of the processing of the correction processing unit 62 may be executed by the central control unit 11.

The present invention is not limited by the above embodiment. Numerous modifications and design alterations are possible within a technical scope not departing from the spirit of the present invention.

For example, the method illustrated in the above embodiment as a method of calculating the reference position (center C) of the luminance contour distribution D with the first calculation unit 52 is an example and is not limiting, and may be arbitrarily altered as appropriate.

Similarly, the method illustrated in the above embodiment as a method of calculating the correction gain reference tables T for shading correction with the first calculation unit 52 is an example and is not limiting, and may be arbitrarily altered as appropriate.

Furthermore, the structure of the imaging device 100 illustrated in the first embodiment is an example, and is not limiting.

For example, the imaging lens unit 1 and the electronic imaging unit 2 may be structures that are detachable from the main body of the imaging device 100.

Although the imaging device 100 has been illustrated as an image processing device, this is not limiting.

That is, the imaging of the predetermined object image P1 for shading correction and the generation of the image data of the predetermined object image P1 may be carried out with an imaging device (not shown in the drawings) other than the imaging device 100, with only image data outputted from this imaging device being recorded and the correction information calculation processing described above being executed.

In the above embodiment, various functions are realized by the correction information calculation unit 5 being driven under the control of the central control unit 11, but this is not limiting. The same functions may be realised by a program or the like being executed by the CPU of the central control unit 11.

In the embodiment described above, an example in which the imaging device 100 in which the present invention is employed is a digital camera is described, but this is not a particular limitation.

For example, the present invention may be generally applied to electronic devices with image processing functions. Specifically, the present invention is applicable to, for example, notebook computers, printers, television sets, video cameras, portable navigation devices, portable telephones, portable video game machines and so forth.

The above-described sequence of processing may be executed by hardware and may be executed by software.

Moreover, the respective functional blocks shown in FIG. 1 may be constituted by hardware units, may be constituted by software units, and may be constituted by combinations thereof.

If a sequence of processing is to be executed by software, a program constituting the software is installed at a computer or the like from a network or a recordable medium or the like.

This computer may be a computer incorporating special-purpose hardware.

The computer may also be a computer capable of executing different kinds of functions in accordance with the installation of different programs, for example, a general-purpose personal computer.

As well as the removable medium that is distributed separately from the main body of the equipment for supplying the program to users, a recording medium containing such a program may be constituted by a recording medium or the like that is supplied to users in a state of being incorporated in the main body of the equipment.

The removable medium is constituted by, for example, a magnetic disc (including floppy disks), an optical disc, a magneto-optical disc or the like. An optical disc is, for example, a CD-ROM (Compact Disc Read-Only Memory), a DVD (Digital Versatile Disc) or the like. A magneto-optical disc is, for example, a MiniDisc (MD) or the like.

A recording medium that is supplied to users in a state of being incorporated in the main body of the equipment is constituted by, for example, a ROM, a hard disc or the like in which the program is stored.

What is claimed is:

1. An image processing device comprising:
an image data acquisition unit that acquires, via an optical system, image data including a luminance component and a color difference component;
a focusing distance acquisition unit that acquires a focusing distance of the optical system;
a shading detection unit that detects shading of the luminance component included in the image data and detects shading of the color difference component included in the image data;
a luminance shading correction coefficient calculation unit that, on the basis of the shading of the luminance component detected by the shading detection unit, calculates a luminance shading correction coefficient that is for correcting the shading of the luminance component, after the focusing distance is acquired by the focusing distance acquisition unit;
a color difference shading correction coefficient calculation unit that, on the basis of the shading of the color difference component detected by the shading detection unit, calculates a color difference shading correction coefficient that is for correcting the shading of the color difference component, after the focusing distance is acquired by the focusing distance acquisition unit;
a conversion unit that converts the color difference shading correction coefficient calculated by the color difference shading correction coefficient calculation unit so as to be at a predetermined ratio with respect to the luminance shading correction coefficient calculated by the luminance shading correction coefficient calculation unit;
a first acquisition control unit that controls the image data acquisition unit so as to acquire a plurality of images by acquiring a plurality of sets of image data while altering an exposure condition, after the focusing distance is acquired by the focusing distance acquisition unit;
a first correction unit that corrects the images acquired by the first acquisition control unit on the basis of the color difference shading correction coefficient converted by the conversion unit;
a pixel addition unit that performs pixel addition of the images corrected by the first correction unit;
a determination unit that determines whether a focusing distance which is acquired by the focusing distance acquisition unit after a correction by the first correction unit, has changed from the focusing distance acquired by the focusing distance acquisition unit before the correction by the first correction unit, after acquiring the plurality of sets of image data by the first acquisition control unit;
a recording instruction detection unit that detects a recording instruction of an image; and
a recording unit that, upon detecting a recording instruction of an image by the recording instruction detection unit after the correction by the first correction unit, records an image obtained by performing pixel addition by the pixel addition unit on the images corrected by the first correction unit, which are corrected based on a zoom position, when it is determined by the determination unit that the focusing distance acquired after the correction by the first correction unit has not changed from the focusing distance acquired before the correction by the first correction unit.

2. The image processing device according to claim 1, further comprising:
an imaging mode setting unit that selects an imaging mode, wherein the first acquisition control unit controls the image data acquisition unit so as to acquire the plurality of sets of image data while altering the exposure condition if it is detected that a mode that captures an image with an expanded dynamic range has been selected by the imaging mode setting unit.

3. The image processing device according to claim 2, further comprising:
a second acquisition control unit that controls the image data acquisition unit so as to acquire one set of image data if it is detected that a mode that captures a single image has been selected by the imaging mode setting unit; and
a second correction unit that corrects the image data acquired by the second acquisition control unit on the basis of the luminance shading correction coefficient calculated by the luminance shading correction coefficient calculation unit and the color difference shading correction coefficient calculated by the color difference shading correction coefficient calculation unit.

4. The image processing device according to claim 1, wherein the luminance component of the image data is image data of a green component in RGB image data that is expressed by color components of red, green and blue.

5. The image processing device according to claim 1, wherein the luminance component of the image data is image data of a green color component of GR lines and image data of a blue color component of GB lines in image data that is acquired by an image sensor in which the GR lines, which acquire image data with red and green color components, and the GB lines, which acquire image data with green and blue color components are alternatingly arranged.

6. The image processing device according to claim 1, wherein, when it is determined by the determination unit that the focusing distance acquired after the correction by the first correction unit has changed from the focusing distance acquired before the correction by the first correction unit, the first correction unit corrects the images using a changed zoom position.

7. An image processing method comprising:
acquiring a focusing distance of an optical system;
detecting shading of a luminance component included in image data acquired via the optical system by an image data acquisition unit and detecting shading of a color difference component included in the image data;
on the basis of the detected shading of the luminance component, calculating a luminance shading correction coefficient that is for correcting the shading of the luminance component, after the focusing distance is acquired;
on the basis of the detected shading of the color difference component, calculating a color difference shading correction coefficient that is for correcting the shading of the color difference component, after the focusing distance is acquired;
converting the calculated color difference shading correction coefficient so as to be at a predetermined ratio with respect to the calculated luminance shading correction coefficient;
controlling the image data acquisition unit so as to acquire a plurality of images by acquiring a plurality of sets of image data while altering an exposure condition, after the focusing distance is acquired;

correcting the acquired images on the basis of the converted color difference shading correction coefficient;

performing pixel addition of the corrected images;

determining whether a focusing distance, which is acquired after the correcting of the acquired images, has changed from the focusing distance acquired before the correcting of the acquired images, after the plurality of sets of image data are acquired; and detecting a recording instruction of an image;

wherein an image obtained by performing pixel addition on the corrected images, which are corrected based on a zoom position, is recorded upon detecting a recording instruction of an image after the correcting of the acquired images, when it is determined that the focusing distance acquired after the correcting of the acquired images has not changed from the focusing distance acquired before the correcting of the acquired images.

8. A non-transitory computer readable storage medium having stored therein a program executable by a computer equipped with an image data acquisition unit, to cause the computer to realize functions comprising:

acquiring a focusing distance of an optical system;

detecting shading of a luminance component included in image data acquired via the optical system by an image data acquisition unit and detecting shading of a color difference component included in the image data;

on the basis of the detected shading of the luminance component, calculating a luminance shading correction coefficient that is for correcting the shading of the luminance component, after the focusing distance is acquired;

on the basis of the detected shading of the color difference component, calculating a color difference shading correction coefficient that is for correcting the shading of the color difference component, after the focusing distance is acquired;

converting the calculated color difference shading correction coefficient so as to be at a predetermined ratio with respect to the calculated luminance shading correction coefficient;

controlling the image data acquisition unit so as to acquire a plurality of images by acquiring a plurality of sets of image data while altering an exposure condition, after the focusing distance is acquired;

correcting the acquired images on the basis of the converted color difference shading correction coefficient;

performing pixel addition of the corrected images;

determining whether a focusing distance, which is acquired after the correcting of the acquired images, has changed from the focusing distance acquired before the correcting of the acquired images, after the plurality of sets of image data are acquired; and detecting a recording instruction of an image;

wherein an image obtained by performing pixel addition on the corrected images, which are corrected based on a zoom position, is recorded upon detecting a recording instruction of an image after the correcting of the acquired images, when it is determined that the focusing distance acquired after the correcting of the acquired images has not changed from the focusing distance acquired before the correcting of the acquired images.

* * * * *